United States Patent [19]

Kezer et al.

[11] Patent Number: 5,347,093
[45] Date of Patent: Sep. 13, 1994

[54] FUZZY TAILORING OF ELEVATOR PASSENGER FUZZY SETS

[75] Inventors: Jeremy B. Kezer, Farmington; Bertram F. Kupersmith, Avon; David J. Sirag, Jr., South Windsor, all of Conn.

[73] Assignee: Otis Elevator Company, Farmington, Conn.

[21] Appl. No.: 95,879

[22] Filed: Jul. 22, 1993

Related U.S. Application Data

[63] Continuation-in-part of Ser. No. 927,039, Aug. 10, 1992, Pat. No. 5,258,587.

[51] Int. Cl.$^5$ .................................................. B66B 3/00
[52] U.S. Cl. ........................................ 187/131; 187/130
[58] Field of Search ................ 187/131, 132, 130, 100

[56] References Cited

U.S. PATENT DOCUMENTS

| | | | |
|---|---|---|---|
| 4,491,199 | 1/1985 | Shea et al. | 187/29 R |
| 4,691,808 | 8/1987 | Nowak et al. | 187/125 |
| 4,951,786 | 8/1990 | Haraguchi | 187/1 R |
| 5,046,019 | 8/1991 | Basehore | 364/513 |
| 5,219,042 | 6/1993 | Sattar et al. | 187/127 |
| 5,258,587 | 11/1993 | Kezer et al. | 187/131 |

Primary Examiner—Steven L. Stephan
Assistant Examiner—Robert Nappi

[57] ABSTRACT

Fuzzy sets indicative of likelihood of additional weight elevator passengers may have in a given country compared with a standard international low passenger weight, indicative of packages which may be carried up at certain times of day or carried down at certain times of day by passengers in the elevator, and indicative of the weight of additional clothing which may be worn due to different seasons in temperate climates are all added to a basic single passenger fuzzy set so as to more accurately reflect the likely weight of a single passenger. From this are derived fuzzy sets for any number of passengers which may possibly occupy an elevator, which in turn are utilized to provide a passenger fuzzy set indicative of a given weight of the elevator having been caused by various numbers of passengers. Processing details are also disclosed.

20 Claims, 7 Drawing Sheets

FUZZY TAILORING OF ELEVATOR PASSENGER FUZZY SETS

CROSS Reference TO RELATED APPLICATIONS

This application is a continuation-in-part of U.S. patent application Ser. No. 07/927,039, filed on Aug. 10, 1992, U.S. Pat. No. 5,258,587 and entitled "Estimating Elevator Passengers From Gender Ratioed Weight".

TECHNICAL FIELD

This invention relates to estimating the number of passengers in an elevator car based upon weight which takes into account passenger weight variations which can be expected to obtain.

BACKGROUND ART

The number of passengers in an elevator car is frequently employed as a key factor in methods of dispatching elevator cars to provide most effective service to the passengers. Typical examples are determining if a large number of passengers are leaving the lobby floor during the morning rush hour, in which case an up-peak mode of dispatching would be initiated; similarly with respect to downwardly traveling passengers arriving at the lobby floor during the evening rush hour, which may invoke a down-peak mode of dispatching. An example can be found in U.S. patent application Serial No. 07/879,558 filed on May 4, 1992 by Sirag and Weisser, entitled "Using Fuzzy Logic to Determine the Traffic Mode of an Elevator System". In said application, the number of passengers is determined using fuzzy logic in a manner which is described therein, and which is also described and claimed in a commonly owned, co-pending U.S. patent application Ser. No. 07/879,528 filed on May 4, 1992 of Sirag, entitled "Using Fuzzy Logic to Determine the Number of Passengers in an Elevator Car" (both applications are incorporated herein by reference). That method utilizes a large amount of data indicative of the variations in weight which various numbers of people (such as two people, eleven people, twenty-eight people) might weigh in a given elevator system. The data can be obtained empirically by simply observing the number of people in an elevator car and recording that number with the weight indicated by the elevator load weighing system at that time. After collecting large amounts of data, the various weights for any given passenger count can be strung together to form a fuzzy set in which each basis element is a discernible weight for the elevator and the membership for each basis element is dependent on the number of times (normalized) that such weight has been observed. Then, to use the data, for any given weight, a fuzzy set is established which is the membership for that weight basis element within each of the fuzzy sets relating to all possible numbers of passengers. Thus, a slice through those fuzzy sets representing weights for numbers of passengers, results in a single fuzzy set of passengers for a given weight, in which each basis element is a number of passengers and the membership of that basis element is the relative likelihood that that number of passengers will result in the given weight of the set.

There are other ways to determine the number of people in an elevator car, particularly those that use discrete people counters, such as infrared and video techniques of which many are known. However, these can be quite expensive and still are not absolutely foolproof in terms of providing an absolutely accurate count of the number of people that enter or leave an elevator car. In the methodology of the aforementioned Sirag application, if suitable information is acquired empirically, it must present a very accurate prediction of the average number of people at a given weight. On the other hand, the discrete people counters are more likely to present actual rather than average data, but they have been shown to be inaccurate (e.g., missing some passengers; counting baggage as a passenger).

In the aforementioned parent application (which is incorporated herein by reference), the fact that the difference in weight between male and female passengers can significantly affect the accuracy of fuzzy sets which represent an average number of passengers is accommodated by providing separate fuzzy sets indicative of the number of male passengers which might cause a given elevator car load weight, and fuzzy sets of female passengers which might cause a given elevator car load weight, and ratioing each of those fuzzy sets in accordance with the proportionate share of male and female populations within the building. The union of these two fuzzy sets provides a more accurate determination of the likely number of a mix of male and female passengers within the building than the fuzzy sets of average numbers of passengers which has heretofore been utilized in the prior art.

DISCLOSURE OF INVENTION

Objects of the invention include improving the accuracy with which the use of fuzzy sets relating numbers of passengers and weight are utilized to provide a fuzzy indication the number of passengers in an elevator for any given measured weight.

The invention is predicated on our recognition of the fact that the likely weight of individual passengers varies as a function of the likely national heritage (or origin) of the passenger, the amount of clothing worn by the passenger, and the weight of packages which may be carried by the passenger.

According to the present invention, in a method of dispatching elevator cars in a building, a passenger count fuzzy set indicative of a likely number of passengers which results in any given elevator car load weight has factored into it factors indicative of the difference in average weight of people in various countries, seasonal variations in usual amount of clothing to be worn in temperate climates, and the carrying of packages into and out of the building during the various times of the day. In accordance with the invention in one form, the aforementioned variations are accommodated by modifying a predetermined passenger count fuzzy set for a given elevator car load weight. In accordance with the invention in another form, the aforementioned variations are separately applied to average male passenger fuzzy sets and average female passenger fuzzy sets prior to accommodation in accordance with the relative mix of males and females in the population of the building, as described in the aforementioned parent application. In one method of practicing the invention, a plurality of fuzzy sets of weight, determined for each passenger count either empirically or demographically, has the aforementioned variations added therein as weights, prior to extracting therefrom fuzzy sets indicative of likely number of passengers for any given elevator car load weight. According to another implementation of the invention, fuzzy sets indicative either of the weight of a given number of passengers or of the likely number of passengers resulting in any given elevator car load weight have basis elements altered in a manner to reflect the difference in weight (that is to say, each passenger weighing more or fewer passengers resulting when each is bearing more weight, respectively).

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 5:
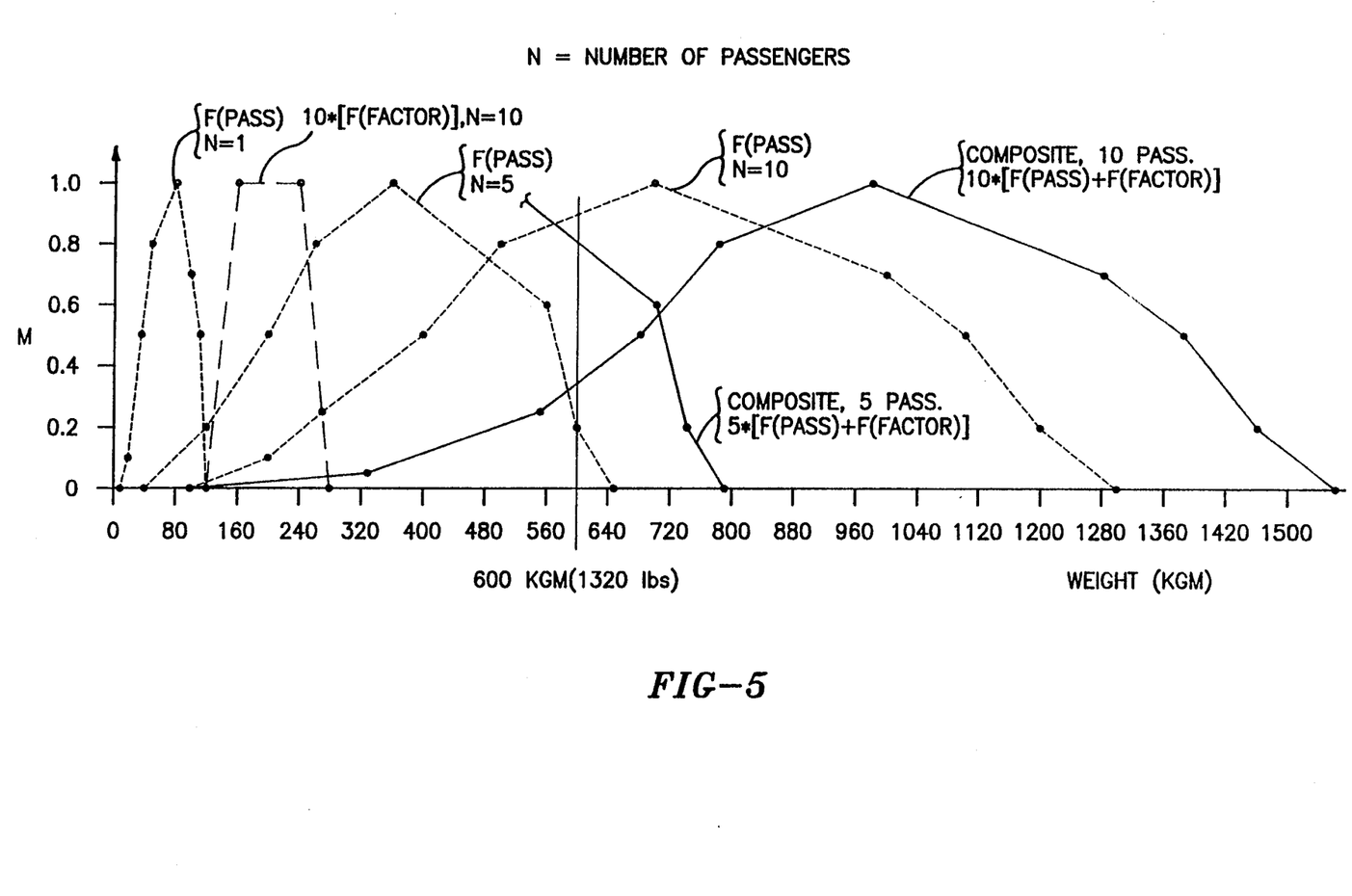
FIG. 5 is a composite illustration of fuzzy sets for a single passenger, five passengers, ten passengers; factors of the type illustrated in FIGS. 1–4, for ten passengers; and a composite fuzzy set for ten passengers.

The present invention utilizes a basic, single passenger fuzzy set which represents the likelihood of various weights for a given individual passenger of minimum international weight, that is to say, for a country or heritage where people tend to weigh the least of peoples on earth (or in a potential elevator passenger population), and has added thereto fuzzy sets indicative of increased weight for countries in which people are heavier, for seasonal clothing in temperate climates, and for packages which may be carried in either the up or down direction at any given time of day. In FIG. 5, the dotted lines are indicative of fuzzy sets for a single passenger (N=1), for five passengers (N=5), and for ten passengers (n=10). The basic fuzzy set for a single passenger, in the example of FIG. 5, may be expressed as: 0.00|10, 0.05|20, 0.50|40, 0.80|50, 1.0|70, 0.70|100, 0.050|110, 0.20|120, 0.00|130. The fuzzy set for ten passengers is the same except each basis element has ten times the weight: 0.00|100, 0.05|200, 0.50|400, etc. Therefore, the shape of the curve is the same for any number of passengers, and is best seen in the curve for ten passengers. FIG. 5 shows weight in kilograms; however, all weights (basis elements) could be expressed as pounds or as percent of full load. The basic fuzzy set for a single passenger may be determined empirically by keeping track of the number of passengers in each elevator run from floor to floor and the weight of that group of passengers. This requires a very large number of observations in order to provide meaningful data. In addition, this method typically is practiced by making the observations for elevators of a given type in similar building environments. On the other hand, the fuzzy set for a single passenger can be determined from demographics of weight for residents of various regions of the world as likely elevator passengers. In addition, the present example herein Starts with a single fuzzy set for a single passenger, however the single passenger fuzzy set may be a composite of male and female fuzzy sets based upon the gender demographics of an individual building, as set forth in the aforementioned parent application. Thus, in providing the original single passenger fuzzy set, the invention of the parent application may be practiced to take into account gender demographics in a building. Such a choice is irrelevant to the invention herein although use of the prior invention will, of course, make the overall result even more accurate.

Figure 1:
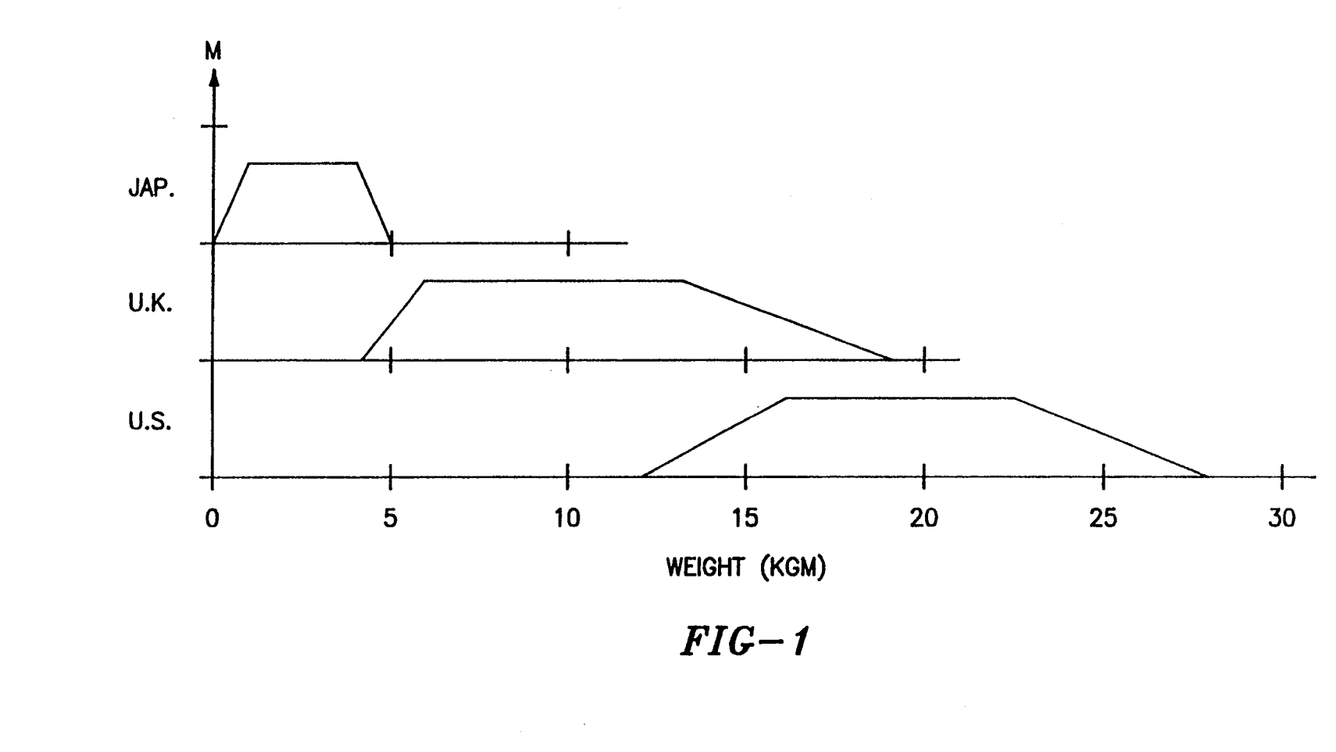
FIG. 1 is an illustration of exemplary fuzzy sets indicative of variation in weight as a function of the country in which an elevator is operating.

The single passenger fuzzy set (N =1, FIG. 5 ) is chosen to be that for a country having the least heavy people on earth, or in the elevator-using world, which may for instance be those of Vietnam, Thailand, or other southern pacific rim nations. In FIG. 1, the additional weight which one might find in Japan is represented by a fuzzy set which ranges from a membership value of 0, for 0 additional kilograms, to a membership value of 1 for basis elements of 1–4 kilograms and returns to a membership value of 0 at 5 kilograms. On the other hand, the additional weight for the USA ranges from a membership of 0 for 12 kilograms to a membership of 1 for 16 kilograms through 22 kilograms and returns to a membership of 0 at 28 kilograms. This reflects the great likelihood of substantially 20 additional kilograms in the USA, on average, compared to the weight of persons within Japan. Similarly, for the United Kingdom, a fuzzy set ranges from a membership of 0 at 4 kilograms additional weight to a membership of 1 for 6–13 kilograms of additional weight and then tapers off to a membership of 0 for 19 kilograms of additional weight, reflecting essentially a 10 kilogram decrease from that of the United States, on average. Demographics can be utilized to develop fuzzy sets for the additional weight for other countries of interest as well. Of course, in determining the demographics, one does not only incorporate natives of that country, but the demographics of the building using public, regardless of the individual passenger's origin; within the United States, the public includes many lightweight persons, such as Asians.

Figure 2:
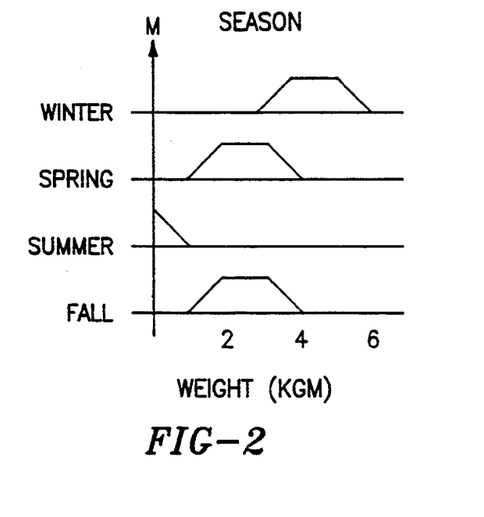
FIG. 2 is an illustration of fuzzy sets indicative of weight variations which may result in different seasons as a function of clothing which is worn in temperate climates.

In FIG. 2, the fuzzy set for the winter season illustrates the increased weight for maximum winter clothing in temperate climates, such as Europe, the United States and Japan. The winter fuzzy set ranges from a membership of 0 for 2 kilograms of additional weight to a membership of 1 for 3 kilograms through 5 kilograms of additional weight and then reduces to a membership of 0 for 6 kilograms of additional weight. The fuzzy sets for spring and fall reflect intermediate additional clothing, ranging from a membership of 0 for a basis element of 0 additional weight to a membership of 1 for 1–3 kilograms of additional weight and tapering to a membership of 0 for 4 kilograms of additional weight. The fuzzy set for the summer season ranges from a membership of 1 for 0 kilograms of additional weight to a membership of 0 for 2 kilograms of additional weight, reflecting light, but dress clothing.

Figure 3:
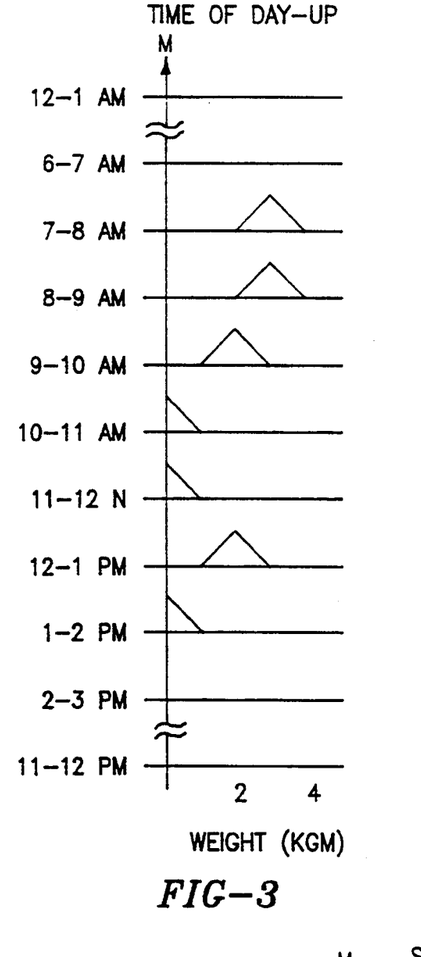
FIGS. 3 and 4 are illustrations of fuzzy sets indicative of weight variations which may occur as a consequence of packages being carried at various times of day in the up and down directions, respectively.
Figure 4:
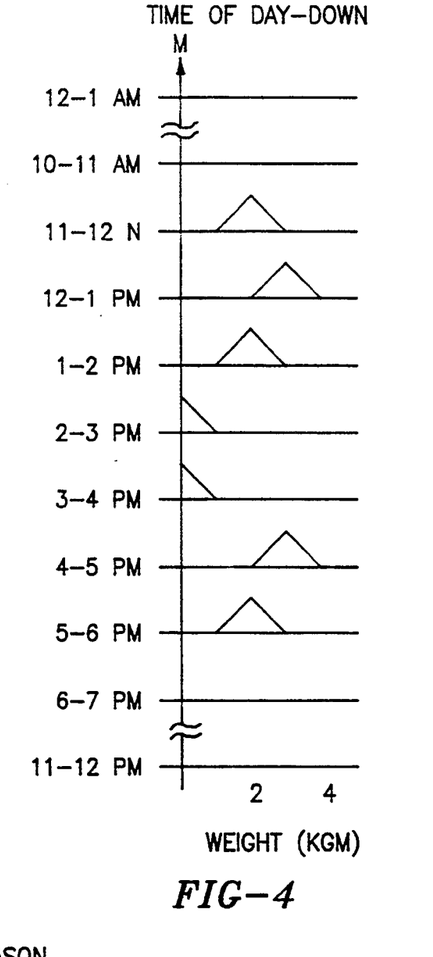

In FIGS. 3 and 4, there are illustrated exemplary fuzzy sets for different hourly periods within the time of day for both the up and down directions which reflect the likelihood of passengers carrying parcels in and out of the building. In the up direction, it is seen that the carrying of packages is deemed to be most likely in the early morning rush hour, becoming only slight in the late morning, resuming somewhat in the noon hour, and tapering off to 0 after 2:00 pm. In the down direction, the fuzzy sets reflect the greatest likelihood of carrying packages down during the middle lunch hour, and in the early evening, with lesser chances in the fringes of the noon hour and next to minimal likelihood during the afternoon. The fuzzy sets for packages illustrated in FIGS. 3 and 4 may be developed from statistically valued data from samples in exemplary buildings, or in any other suitable way. The factors in FIGS. 2–4 may be additionally adjusted for different parts of the world; that is, the actual values of the fuzzy sets in FIGS. 2–4 may be different in one country than in another in instances where it is determined that a given country does not follow an international norm of any sort.

In this invention, the factors illustrated in FIGS. 2–4 are added to the basic single passenger fuzzy set (N=1) illustrated in FIG. 5 so as to develop a composite fuzzy set for a single passenger. An example of the U.S. country factors is shown for ten passengers by the dash line. When the factor for ten passengers as shown by the dash line is fuzzy-added to the basic passenger fuzzy set for ten passengers, shown by the dotted line, N=10, the result is a composite ten passenger fuzzy set illustrated by the solid line for ten passengers. Because of the fact that the algebraic properties of addition and of multiplication by ordinary members for fuzzy sets are commutative, associative and distributive, the factor fuzzy set can be multiplied by the number of passengers, the passenger set multiplied by the number of passengers, and then the two products can be added; or the factor fuzzy set for a single passenger can be added to the basic single passenger fuzzy set and then multiplied by the number of passengers to provide the composite fuzzy set for any given number of passengers. Because of the reduced processing, the latter is chosen in the exemplary embodiment herein.

Figure 6:
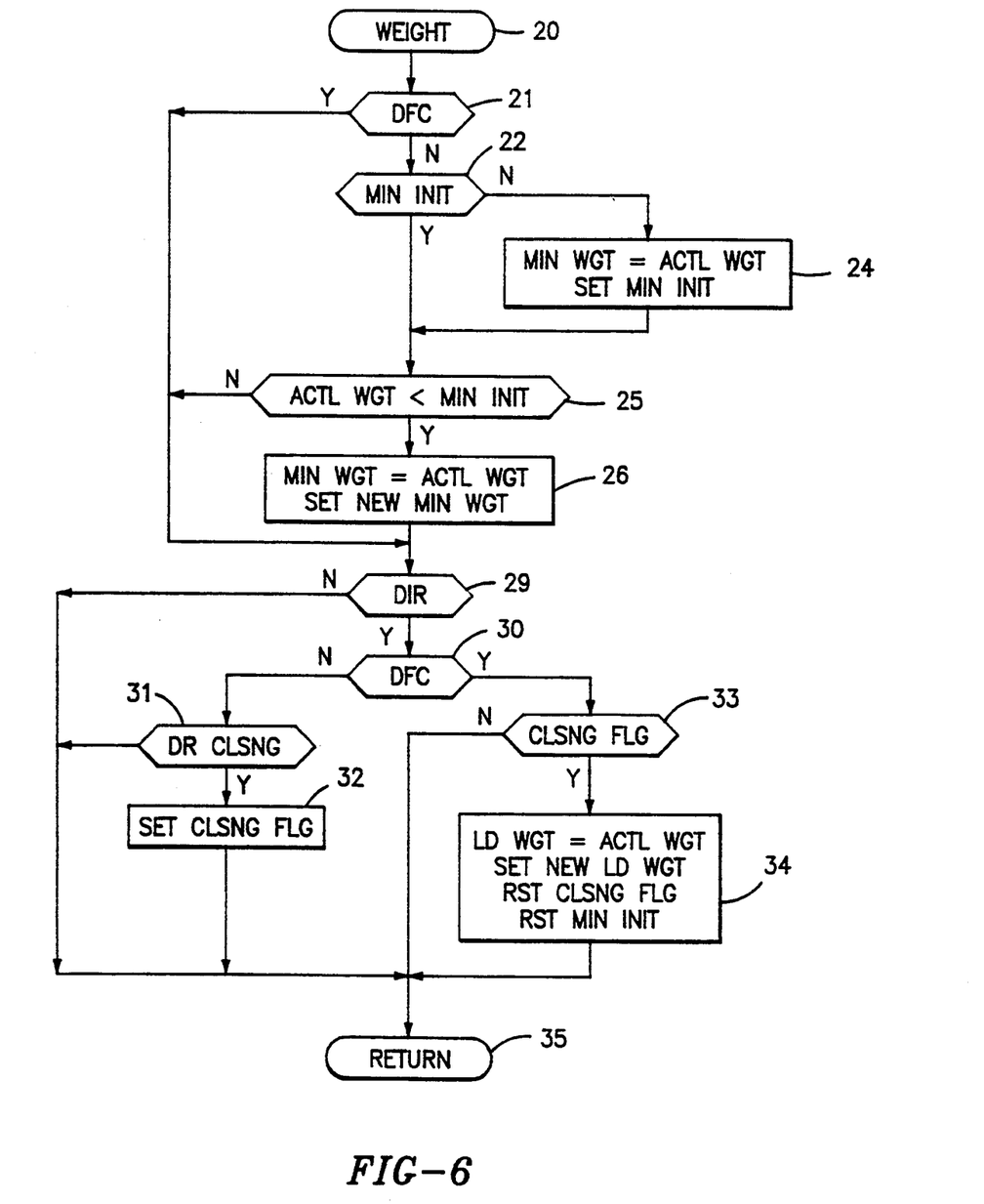
FIG. 6 is a logic flow diagram of an exemplary routine for recording the minimum weight in the elevator while at a landing, indicative of the number of passengers remaining after all passengers have embarked, and for recording the load weight of the elevator indicative of the number of passengers traveling between floors.

Referring now to FIG. 6, a logic flow diagram to determine and record the minimum weight and the load weight of the vehicle, from which the number of passengers entering, leaving, and riding to a next stop can be determined, is reached through an entry point 20 and a first test 21 determines if the doors are fully closed or not. If they are not, this indicates that the elevator is at a landing and passengers may be getting off and on. A negative result of test 21 reaches a test 22 to determine if a "minimum initialize" flag has been set or not. This is a local flag used to keep track of when the comparison of weight has started, seeking the minimum weight of the elevator indicative of passengers who are not going to leave the elevator. When the doors first begin to open, the first pass through test 21 will reach a negative result of test 22 which causes a pair of steps 24 to initialize the minimum weight at the current actual weight of the elevator (before any passengers get off) and to set the minimum initialize flag for use in the test 22. Then a test 25 determines if the actual weight (as determined by the load sensor of the elevator) is equal to or less than the currently recorded minimum weight (which is initialized in the steps 24). In the first pass through test 25 the result is negative since it was initialized to be equal to the actual weight in the steps 24, so the minimum weight remains as it was set. In subsequent passes through the routine, the negative result of test 21 and an affirmative result of test 22 will again cause test 25 to be reached, and when any passenger leaves the elevator, the actual weight will be reduced and become less than the minimum weight. This will cause an affirmative result of test 25 reaching steps 26 where the minimum weight is adjusted to the current actual weight and a "new minimum weight" flag is set (for use as described with respect to FIG. 8 hereinafter).

If, on the other hand, the doors are fully closed, an affirmative result of step 21 bypasses steps and tests 22–26. In either event, a test 29 determines if the elevator has a traveling direction or not. When the elevator is stopped at a landing and the doors are opening or opened, it does not have a direction until it is ready to close the doors and begin a run. Therefore, the presence of direction is indicative of the impending closing of the doors for the next run. An affirmative result of test 29 reaches a test 30 to determine if the doors are fully closed or not. Initially, as soon as a direction is assigned, the doors will be closing and therefore are not fully closed so a negative result of test 30 will reach a test 31 to see if the doors are closing (in contrast with opening, which indicates that the car is approaching a landing). When the car has been at rest with the doors fully open, passengers have gotten off and gotten on, there will be direction, the doors will not be fully closed, but the doors will be closing, so an affirmative result of test 31 will reach a step 32 to set a closing flag. When the doors finally do become closed following a stop at a landing, the closing flag having been set, an affirmative result of test 30 will reach a test 33 to see if the closing flag has been set. If not, then this is an indication that the car is simply proceeding in the up or down direction with its doors fully closed, and there is no need to perform any function whatsoever. On the other hand, if the closing flag has been set, this indicates that the doors have just closed following a stop at a landing, so an affirmative result of test 33 will reach a series of steps 34 in which the load weight (indicative of the weight of passengers traveling from one floor to the next) is set equal to the actual weight of the elevator. This is achieved just prior to motion of the elevator so acceleration of the passengers does not affect the measured weight signal. And, the steps 34 also set a "new load weight" flag, indicating that a new weight has been measured so that a new determination of the number of traveling passengers can be made; the closing flag is reset in preparation for the next landing, and the minimum initialize flag is reset in preparation for the next landing. And then other parts of the program are reverted to through a return point 35.

Figure 7:
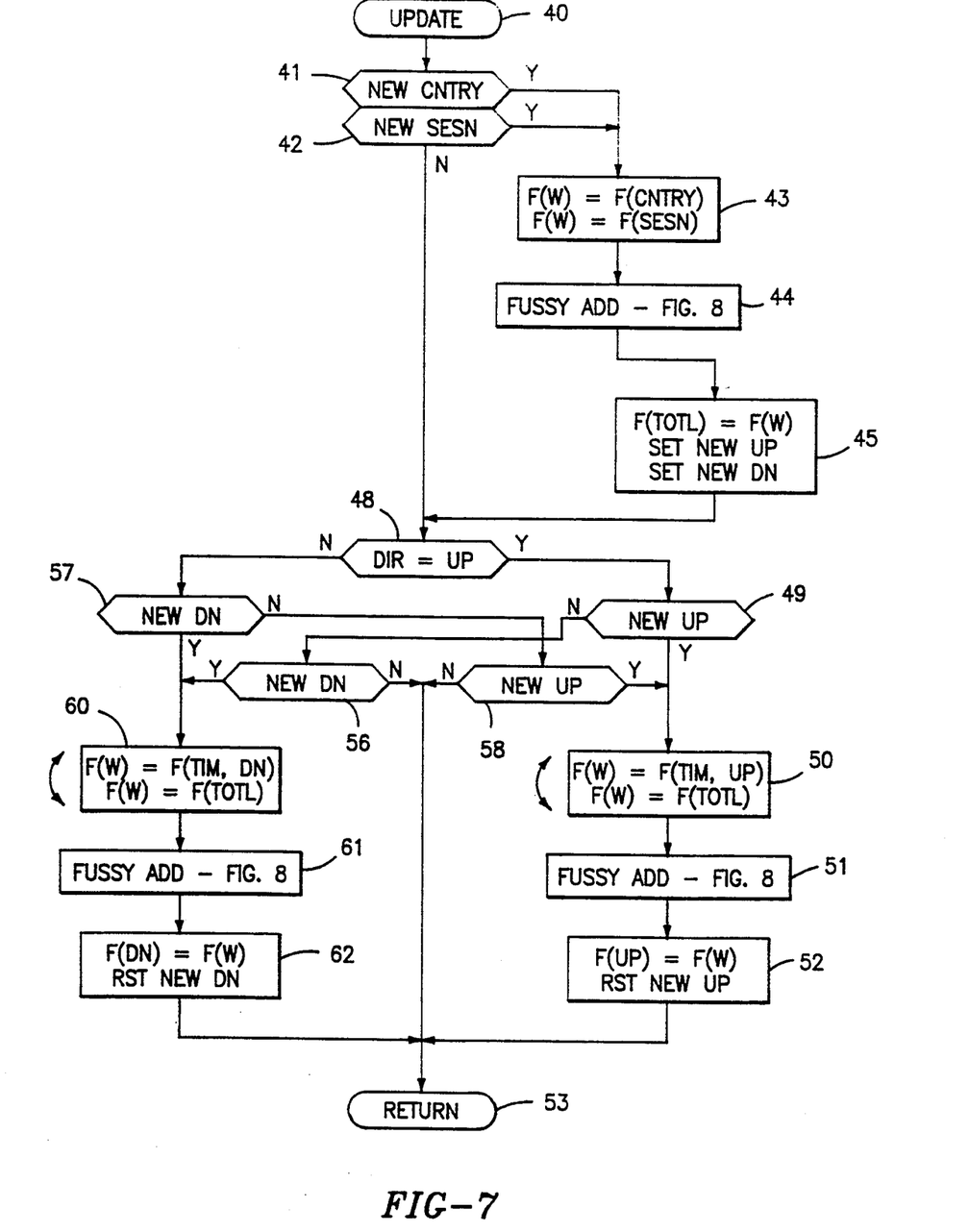
FIG. 7 is a logic flow diagram of an update routine for adding together fuzzy sets of the type illustrated in FIGS. 1–5, when required.
Figure 9:
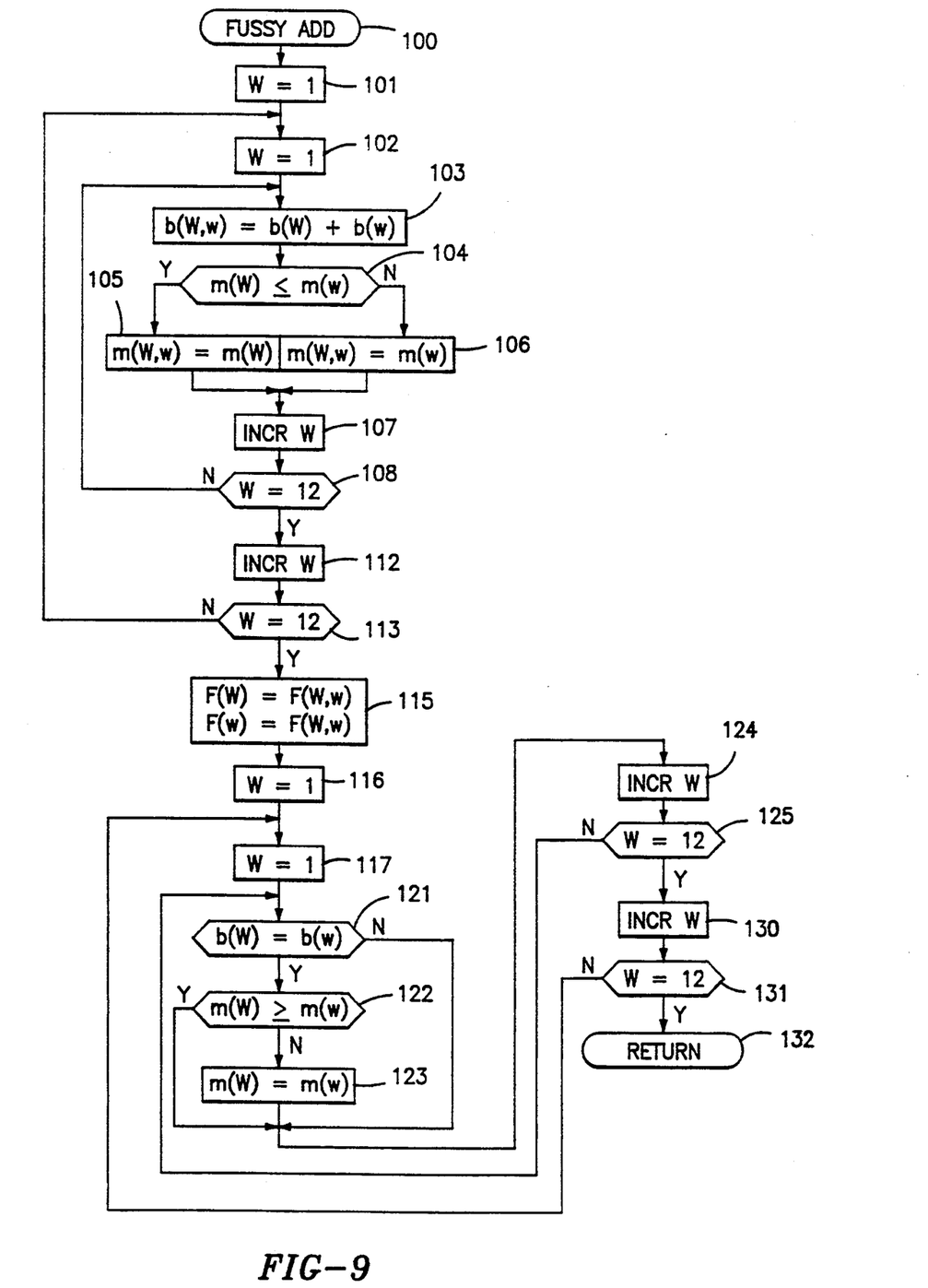
FIG. 9 is a logic flow diagram of a routine for determining membership values for passenger basis elements as a function of load weight utilizing composite fuzzy sets of the type illustrated in FIG. 5.

In FIG. 7 an update routine will update the fuzzy set utilized to determine the number of remaining passengers from the minimum weight signal and the number of load passengers, traveling from one floor to the next, from the load weight signal. As described hereinbefore with respect to FIGS. 1–5, the fuzzy set utilized is a composite fuzzy set including the possible summation of at least three factors, including the country factor indicative of the likely average weight of building passengers, the season factor indicative of weight of additional clothing in temperate climates, and the time factor indicative of a likelihood of carrying passengers when traveling in either the up or down direction. In order to form the composite fuzzy set, the update routine of FIG. 7 is reached through an entry point 40 and a first test 41 determines if the elevator has been newly assigned to a country, or otherwise has had the assigned fuzzy set from among those illustrated in FIG. 1 altered. If not, a test 42 determines if the season has changed from summer to fall, fall to winter, winter to spring, or spring to summer. If either of these have occurred, then the fuzzy sets for the country and the season are added together by first establishing that one of the working fuzzy sets to be added F(W), which also becomes the resulting fuzzy set as seen in FIG. 9 is set equal to the selected fuzzy set for the country (from FIG. 1) and another working fuzzy set, F(w) is set equal to the fuzzy set for the season selected from FIG. 2. Then these two fuzzy sets are added together with the rules of fuzzy addition as is described hereinafter with respect to FIG. 9, and the result, F(W), is stored for future use as F(TOTL), in a series of steps 45. Whenever a new sum of these two fuzzy sets is prepared, it is necessary to prepare a new composite fuzzy set so the steps 45 set a "new up" flag and a "new down" flag, for purposes described below.

For the up direction (FIG. 2), there is no change occurring between 2:00 pm and 7:00 am so no changes in the composite need to be made as a consequence of the time of day during that time period for the up direction. Similarly, there is no change in the time of day factor for the down direction (FIG. 3) between 6:00 pm and 10:00 am so no new composite need be made. However, for the up direction, at 7:00 am, 9:00 am, 10:00 am, 12:00 noon, 1:00 pm and 2:00 pm a new up signal is generated; in addition, a new down signal is generated for the down direction at 11:00 am, 12:00 noon, 1:00 pm, 2:00 pm, 3:00 pm, 4:00 pm, 5:00 pm and 6:00 pm. Thus any time that the fuzzy sets change for the up direction, the new up flag is set and, independently, any time the fuzzy sets for the down direction change, the new down flag is set. And as described, both flags are set whenever either the country or season fuzzy sets have changed, so as to form new composite sets.

A test 48 determines if the direction is up; an affirmative result will reach a test 49 to determine if the new up flag is set. If it is, an affirmative result will reach a step 50 where the first working fuzzy set, F(W), is set equal to the result of the addition of the country and season fuzzy sets, F(TOTL). Then the second working fuzzy set, F(w) is set equal to the fuzzy set of a current time in the up direction, F(TIM, UP); this is whichever one of the fuzzy sets in FIG. 3 relates to the current time of day. Then these two are added together in a routine 51, as described hereinafter with respect to FIG. 9. The fuzzy set for the up direction, F(UP), to be used during the remainder of the present time increment (FIG. 3), is set equal to the result, F(W), and the new up flag is reset in steps 52. And then, other parts of the program are reached through a return point 53.

If the direction is up, an affirmative result of test 48 will reach test 49; but if the new up flag has been reset (in steps 52), then a negative result of test 49 will reach a test 56 to determine if the new down flag is set. The reason for taking direction into account in the test 48 is simply to develop an updated composite fuzzy set needed for the direction of travel to which the elevator is currently assigned first, and develop the other one, if needed, later. If on the other hand, the result of test 48 is negative, a test 57 is reached to determine if the new down flag is set. If not, then a test 58 is reached to see if the new up flag is set. But if either test 56 or 57 is affirmative, then a series of steps 60 are reached in which the first working fuzzy set, F(W), is set equal to the result of addition of the country and season fuzzy sets, F(TOTL), and the other working fuzzy set, F(w), is set equal to the fuzzy set for the current time period in the down direction, F(TIM, DN). Then, a routine 61 is reached to perform a fuzzy add as described with respect to FIG. 9 hereinafter and a pair of steps 62 preserve the result as the fuzzy set for the down direction, F(DN), and reset the new down flag. Then other parts of the program are reverted to through the return point 53. The net effect of the steps and tests 48–62 is simply to generate, first for the current direction of travel if there be one, new fuzzy sets for the up and down directions whenever the country, the season, or the time for the up direction or down direction, respectively, have changed.

It is to be noted that the determination of the minimum weight and the load weight in the routine of FIG. 6 is done on a time basis dependent upon operation of the elevator, whereas the generating of new fuzzy sets is based upon totally different things, including (in the greatest number of cases) the time of day. The use of the determined minimum and load weights and the up and down fuzzy sets is performed on yet a different basis; typically this will be as the elevator is proceeding from one floor to the next, it having determined the minimum and load weights prior to traveling between floors; this can be performed at a time selected by the programmer with respect to other functions to be performed in dispatching the elevator and controlling its motion profile, doors, call buttons and lights, and the like.

Figures 8, 10, 11:
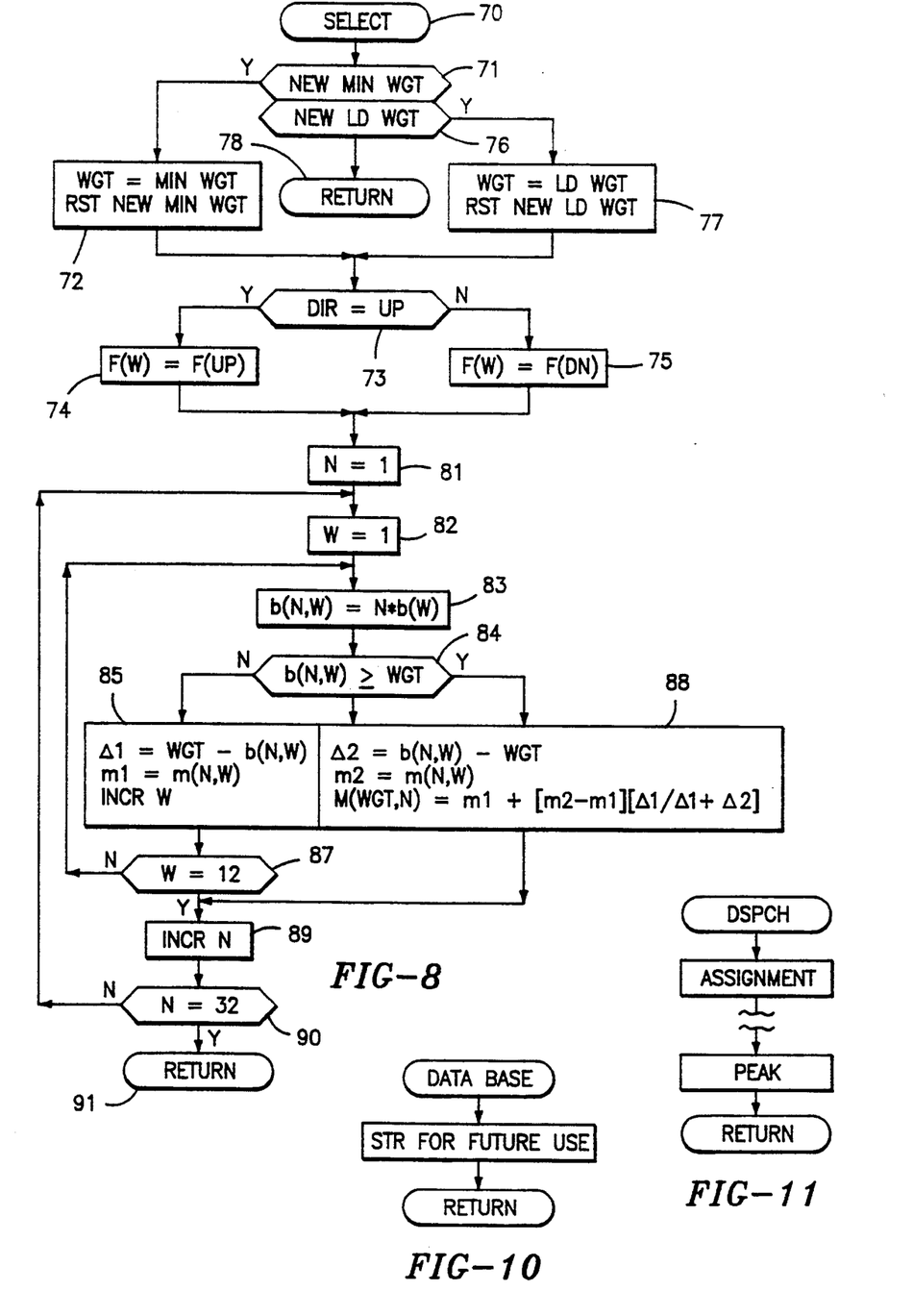
FIG. 8 is a logic flow diagram of an exemplary routine for performing fuzzy addition.
FIGS. 10 and 11 are simplified logic flow diagrams illustrating the storage of passenger information derived in accordance with FIGS. 6–8 and use thereof in dispatching of elevators, respectively.

In FIG. 8, a select subroutine, which selects the membership values for various number of passenger basis elements in a fuzzy set related to given weight (the minimum weight or the load weight) is reached through an entry point 70. A first test 71 determines if the new minimum weight flag (FIG. 6) has been set, or not. If it has, a pair of steps 72 cause a working value of weight (WGT) to be set equal to the last determined minimum weight so that a fuzzy set of the number of passengers related to that minimum weight can be developed; and, the new minimum weight flag is reset. Then, the fuzzy set is chosen by virtue of a test 73 which determines if the direction is up. If it is, one of the working fuzzy sets, F(W), is set equal to the up direction fuzzy set, F(UP), in a step 74. If the direction is not up, then that working fuzzy set is set equal to the fuzzy set for the down direction, F(DN), in a step 75. If on the other hand, the new minimum weight test 71 is negative, a test 76 determines if the new load weight flag is set, or not. If so, a pair of steps 77 will set the working weight factor (WGT) equal to load weight and reset the new load weight flag. But if neither the new minimum weight flag nor the new load weight flag are set, the routine of FIG. 8 will cause other parts of the program to be reverted to through a return point 78. In other words, once the weight fuzzy sets have been created (as is described with respect to the rest of FIG. 8 and FIG. 9, below), as indicated by resetting the new weight flag, the routine of FIG. 8 is simply bypassed by negative results of tests 71 and 76 causing it to return through the point 78.

Having selected the weight (MIN, LD) and the composite fuzzy set (F(UP), F(DN)) to be used, the routine of FIG. 8 reaches a step 81 where N, a value indicative of number of passengers, is set equal to 1. Then a step 82 sets W, a number used to step through a fuzzy set, equal to 1 in order to initiate the process. A step 83 sets the basis element for the Wth term for one passenger (initially) equal to 1 times the basis element for the Wth term of the single passenger composite fuzzy set (selected in either step 74 or step 75). Then, a test 84 tests if the basis element for the current term, that is, the Wth term which was multiplied in the step 83; initially, this will be the Wth term for a single passenger taken directly from the fuzzy set selected in one of the steps 74, 75. Test 84 determines if this is equal to or greater than the weight (selected as either the minimum weight or the load weight in one of the steps 72, 77). Initially, and typically for several cycles, it will not be, so a negative result will reach a series of steps 85 where a factor $\Delta 1$ is set equal to the difference between the weight and the basis element, a membership value, m1, is set equal to the membership of the Wth term for the N passenger fuzzy set (for use described hereinafter, and W is incremented.

Typically, as in the example of 600 kilograms, FIG. 5, the actual weight being tested (either minimum weight or load weight) will be greater than the basis element of the first term (although it may not be) and a negative result will reach the steps 85, to increment W, and a test 87 will determine if $W=12$ yet or not. The number 12 is selected in the exemplary embodiment herein to illustrate that the invention can be usefully performed with a very small number of terms, such as 12, in the basic single passenger fuzzy set. That number could be even smaller ($N=10$, FIG. 5 has nine terms), and certainly could be larger if the data processor involved has sufficient time and power to process more terms of a fuzzy set. One embodiment uses 300 terms. Initially, the result of test 87 will be negative since only one term has been processed. This will cause the routine to revert to the step 83 where the second basis element of the fuzzy set is multiplied by N (in this case N is still equal to 1 ). Again, test 84 will likely be negative so that steps 85 are reached. This process will continue until finally the weight being processed (either minimum weight or load weight) is higher than the basis element of the Wth term (in which case a series of steps 88 will be reached) or W is incremented to 12 (in which case the loop will be exited by an affirmative result of test 87). Assume that for $N=1$, the weight does not exceed any of the terms in the chosen fuzzy set for a single passenger. This certainly would be true for the illustrative case in FIG. 5 where the weight being processed is 600 kilograms, as shown. When all the basis elements for the 1 passenger composite fuzzy set have been negatively tested, an affirmative result of test 87 reaches a step 89 to increment N to 2 passengers. A test 90 determines that 32 passengers (an exemplary maximum possible number in an elevator) have not been processed, so a negative result reaches step 82 where W is restored to one, and the process is repeated for a 2 passenger composite fuzzy set. In fact, there is no basis element at all in any of the fuzzy sets for $N=1$, 2 or 3 passengers (not shown on FIG. 5). However, when the fuzzy set for a single passenger has been multiplied by 4, in the example of FIG. 5, the 12th term ($W=12$) will in fact have a weight greater than the exemplary weight of 600 kilograms, so an affirmative result of test 84 will reach the series of steps 88 where another factor, $\Delta 2$, is set equal to the difference between the basis element for the 12th term and the weight being processed, a membership value, m2, is set equal to the membership of the 12th term, and a term of the weight fuzzy set for the particular weight being processed (in the example of FIG. 5, 600 kilograms), having a basis element of four passengers, is given a membership value, M, equal to the straight line interpolation between the membership value for the 11th term and the 12th term in this example, by utilizing the membership value of the 11th term plus a fraction of the difference between the membership values of the 12th and 11th terms determined as a ratio of $\Delta 1$ over the sum of $\Delta 1$ plus $\Delta 2$, in a straightforward, well-known fashion. At this point, the first term of a 600 kilogram fuzzy set has been established with a small likelihood (possibly 0.05 in the example of FIG. 5) of there being four passengers causing the weight of 600 kilograms. Since the term for four passengers has been determined in the steps 88, there is no further need for processing the fuzzy set of four passengers. Therefore, following the steps 88, the step 89 is reached where N is incremented to five passengers and the test 90 determines if fuzzy sets for 32 passengers have been processed as yet or not. At this point, they have not, so a negative result of test 90 will reach the step 82 to set $W=1$ once again to begin processing for five passengers.

An affirmative result of test, 84 means that the weight is either at the basis element of the last term or between the basis elements of the last two terms. However, as is seen more clearly with respect to the five passenger composite set hereinafter, if any term is not above the weight being processed, then the properties of this term are saved since it may be the lower one of two terms which span the weight, by a negative result of test 84 reaching the steps 85 to set $\Delta 1$ and m1. In the case of a five passenger composite set ($N=5$ in FIG. 5) it is clear that there will be several basis elements lower than the 600 kilogram weight being processed prior to there being a basis element higher than that. Therefore, successive passes through the steps and tests 82–87 will continuously update $\Delta 1$ and m1 in the steps 85 until, for instance at $W=6$, the basis element for the 6th term for the five passenger composite fuzzy set will be greater than the 600 kilogram weight being processed. This will cause an affirmative result of test 84 to reach the steps 88 where $\Delta 2$ is taken to be the difference between the basis element of the 6th term and the weight, and m2 is taken to be equal to the membership of the 6th term of the five passenger fuzzy set, which is about 0.8 or so in the example of FIG. 5. And the final one of the steps 92 is a straight line interpolation to provide a membership value for the five passenger term of the 600 kilogram fuzzy set. Then, since there is no further need to examine the five passenger fuzzy set, its term having been established in the steps 88, the step 89 will increment N to reach the six passenger fuzzy set. The test 90 determines if fuzzy sets for up to 32 passengers have been processed, or not. If not, then the additional fuzzy sets are processed for 6, 7 and 8 passengers and so forth until finally an affirmative result of test 90 causes other parts of the program to be reached through a return point 91.

Referring now to FIG. 9, an exemplary routine for performing the addition of two fuzzy sets in accordance with the rules of fuzzy arithmetic is reached through an entry point 100. A first step 101 sets to 1 a factor, W, utilized to keep track of the successive terms in one of the two fuzzy sets which is to be added. Then a step 102 sets to 1 a second factor, w, utilized to keep track of the terms in the other of the fuzzy sets to be added. As is known, addition of two fuzzy sets in accordance with the rules of fuzzy arithmetic comprises adding the basis element of each term of one fuzzy set with the basis element of every term in the other fuzzy set and coupling the sum to a membership value which comprises the least membership value among the two terms so added. Thereafter, all of the terms having the same basis element are combined simply by retaining that basis element with the largest membership value among all of the like terms in the result. Thus, a first step in the addition process 103 creates a first term in a summation fuzzy set, b(W,w), equal to the summation of basis elements of the first terms (initially) of both fuzzy sets, b(W), b(w). Then a test 104 determines if the membership value, m(W), of the first term in one of the fuzzy sets, F(W), is equal or less than the like term, m(w), of the other fuzzy set, F(w). If it is, the membership value for that term in the summation is taken to be the membership value, m(W), in a step 105. Otherwise, a negative result of test 104 will cause the membership value for the first term in the summation to be m(w), in a step 106. Then, the second term of F(w) will be added to the first term of F(W) because a step 107 increments w, and a test 108 determines that w is as yet the total number of terms in the fuzzy sets, in this example, 12. Initially, it is not, so a negative result of the test 108 causes the routine to revert to the step 103 where the basis element of the first term of one of the fuzzy sets is added to the basis element of the second term of the other fuzzy set, and the test and steps 104–106 determine the minimal membership value between those two terms. Then, w is incremented in step 107 and tested in step 108 to see if all 12 terms of the second fuzzy set have been added to the first term of the first fuzzy set. Eventually it will, so an affirmative result of test 108 will reach a step 112 where W is incremented to point to the second term of the first fuzzy set. A test 113 determines if all terms of the second fuzzy set have been added with the terms of the first fuzzy set or not; initially it will not, so a negative result of test 113 causes the routine to revert to the step 102 where w is reinitialized at 1 so as to point to the first term of the second fuzzy set, F(w), for addition with the second term of the first fuzzy set, F(W). After all of the terms of each set have been added to each of the terms of other set an affirmative result of test 113 will reach a pair of steps 115 where both of the working fuzzy sets, F(W), and F(w), are set equal to the summation which has just been reached, F(W,w). Then, both W and w are initialized at 1 in a pair of steps 116 and 117 and the terms are tested to see if any terms are alike. This begins by testing the first term, b(W), of one of the working fuzzy sets with the first term, b(w), of other working fuzzy set. Of course, in this case, they are identical, so an affirmative result of test 121 reaches a test 122 to determine if either term has a larger membership value. In this case, they are equal so an affirmative result of test 122 will bypass a step 123 where otherwise the term of the other fuzzy set could be substituted. In this protocol, therefore, the end result of a summation of two fuzzy sets, with like terms being combined with the largest membership value will result as being the first one of the working fuzzy sets, F(W). After the first terms are compared together, W is incremented in the step 124 and tested to see if all of the terms of the second working fuzzy set, F(w), have been compared with the first term of the first fuzzy set, F(W). Initially, it will not so a negative result of the test 125 will cause the routine to revert to the test 121 to compare the first term, b(W), of the first working fuzzy set with the second term, b(w), of the other working fuzzy set. This process will continue until the first term of the first working fuzzy set, F(W), has been compared with all 12 terms of the other working fuzzy set, F(w). At that time, an affirmative result of test 125 will reach a step 130 where W is incremented so as to point to the second term in the first working fuzzy set, F(W), so that it may be compared with all the terms of the other working fuzzy set, F(w). Then, a test 131 determines if all the terms of the second fuzzy set have been compared, or not; initially, they will not so a negative result of test 131 causes the routine to revert to step 117 where the term identifier, w, for the second fuzzy set is reinitialized at 1. In a like fashion, all of the terms of the first working fuzzy set, F(W), as identified by W, will be compared against all of the terms of the other working fuzzy set, F(w), as identified by w. When all comparisons are complete, an affirmative result of the test 131 will cause other parts of the program to be reverted to through a return point 132. Note that the result is stored as the first working fuzzy set, F(W).

The processed fuzzy sets herein have not been normalized (ratioed for the largest membership to equal 1). Any of them may be, if desired. Probably, only the resultant fuzzy set developed in FIG. 8 need be normalized.

The exemplary routine illustrated with respect to FIG. 9 may be utilized to add fuzzy sets wherever called for in the routines of FIGS. 6–8. On the other hand, fuzzy addition can be performed in other ways. For instance, the fuzzy sets expressed as pairs of stored values including a basis element and a membership value described hereinbefore, may instead be stored as series of equations with ranges of values of basis elements or break points within which the equation for the membership value holds. For instance, the basic single passenger fuzzy set, F(PASS), N=1, in FIG. 5, may be expressed as follows:

| | |
| --- | --- |
| $b \leq 0$ | $m = 0$ |
| $20 < b < 40$ | $m = 2b - 30$ |
| $40 < b < 50$ | $m = 3b - 70$ |
| $50 < b < 70$ | $m = b + 30$ |
| $70 < b < 100$ | $m = 170 - b$ |
| $100 < b < 110$ | $m = 270 - b$ |
| $110 < b < 120$ | $m = 380 - 3b/2$ |
| $120 < b < 130$ | $m = 260 - b$ |
| $130 \leq b$ | $m = 0$ | where m ranges from 0 to 100, and b is in kilograms.

If the fuzzy set is expressed in that fashion, then the fuzzy addition may be performed in the manner described in Section 1.4 of Kaufman and Gupta, *Introduction to Fuzzy Arithmetic: Theory and Applications*, Van Nostrand Reinhold, 1985, and multiplication (step 83, FIG. 8) may be performed as in Section 1.5 thereof. Such a process would be less iterative than that described with respect to FIG. 9 hereinbefore, but would require a greater amount of storage and more complex calculations. Suffice it to say that it is irrelevant to the present invention, any method of summation being within the invention.

The resultant passenger count fuzzy set can be used as such or may be converted to a crisp number, if desired.

The invention may also be practiced in very rudimentary forms either by simply adding weight to the single passenger basic fuzzy set, the weight being a crisp value equal to the summation of the average amount of clothing, packages and demographic weight increase for the particular building, season and time in question. This would avoid the necessity of summing all the factor fuzzy sets with the single passenger fuzzy set, thereby eliminating a great deal of processing. The remainder of the process, selecting the membership value for each passenger basis element in a fuzzy set corresponding to the actual weight involved, would remain the same. Yet another simple method of practicing the invention in a rudimentary form would develop the fuzzy set for weight as in the embodiment of FIG. 8 but using the simple, basic single passenger set (N=1, FIG. 5) in the processing of steps and tests 81-91 of FIG. 8. Then, the basis elements in the passenger fuzzy set for the weight involved (e.g., 600 kilograms in the example herein) would have each of the passenger basis elements reduced by an average fraction of an average passenger indicative of the summation of average clothing, packages and demographic weight of the building. Although this results in fractionalized passengers, the fuzzy set could be rewritten with the nearest whole numbers if desired, or utilized as is with fractions, which is in fact compatible with many of the dispatching processes which may use fuzzy sets indicative of the number of passengers for a given weight. However, the methodology disclosed in FIGS. 1-9 herein is clearly preferred since it is more accurate; and use of gender demographics as in the aforementioned parent application is also recommended when accuracy is desired.

FIGS. 10 and 11 illustrate that the passenger fuzzy set having a plurality of terms, each term of which has a basis element indicative of a number of passengers, with a membership value indicative of the likelihood that that number of passengers has caused the weight in question, are utilized for dispatching of elevators. For instance, such fuzzy sets may be stored for future use in order to have fuzzy values to predict, for dispatching, the number of passengers boarding, deboarding, and traveling on an elevator. Or, crisp numbers of these may be determined from the fuzzy sets and stored for future use to predict traffic patterns. On the other hand, the fuzzy sets may be used in real time for dispatching operations such as in the assignment of hall calls, or determining and operating in peak periods. All of this is irrelevant to the present invention.

The seasonal (clothing) and time of day (packages) fuzzy sets represent likelihood of passengers carrying more weight, whereas the country (demographics) fuzzy set represents the likelihood of the passenger weighing more. The fuzzy sets illustrated in FIGS. 1-5 herein are merely exemplary; the details thereof are irrelevant to the invention. As used herein with respect to the fuzzy sets of FIG. 1, the term "country" means country, or region, or any other basis for selecting a particular fuzzy set to represent the likelihood of additional weight of passengers above a minimal international (or other basic weight) likelihood. The fuzzy sets may be added and then multiplied as described, or each fuzzy set may be multiplied by number of passengers, N, and then added to the other, multiplied fuzzy sets; or any other way may be used to provide the equivalent of N times the fuzzy summation of the basic fuzzy set and one or all of the factor fuzzy sets. The fuzzy sets are represented by signals, typically binary numbers, arranged to relate each basis element with a corresponding membership value to form a term, and to relate the terms of each set. Although a given weight e.g., 613 kilograms, may not fall on a basis element reached as the Wth term of a fuzzy set, as used herein, the term "basis element" includes one derived by interpolation, as described.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of dispatching a plurality of elevator cars in a building comprising:

providing a plurality of signals representing a basic fuzzy set for a single passenger including basis elements of the possible amounts of weight which one passenger may add to an elevator car and corresponding membership values indicative of the likelihood that one passenger has added the related amount of weight to the car ;

providing a plurality of signals representing a factor fuzzy set for a single passenger including basis elements indicative of additional amounts of weight which each passenger may have compared with the likelihood of weight expressed in said single passenger fuzzy set, including basis elements of possible additional passenger weight and corresponding membership values indicative of the likelihood of a passenger having the related additional weight;

providing a plurality of signals representing a plurality of composite fuzzy sets, one for each possible number, N, of passengers which may be in the elevator, each reflecting N times the fuzzy summation of said basic fuzzy set and said factor fuzzy set;

providing a weight signal indicative of the weight of passengers in an elevator;

providing a plurality of signals representing a passenger count fuzzy set in which each of the terms corresponds to a related term of one of said composite fuzzy sets which has a basis element equaling the weight indicated by said weight signal, each term of said passenger count fuzzy set having a basis element equaling the number of passengers corresponding to the composite fuzzy set of the related term and a degree of membership the same as the degree of membership of said related term; and dispatching elevators to provide service in said building in response to a process using the signals of said passenger fuzzy set to provide corresponding representations of the number of passengers in said elevator.

2. A method according to claim 1 wherein said step of providing signals representing a factor fuzzy set comprises:

providing signals representing said factor fuzzy set as the fuzzy summation of a fuzzy set including basis elements indicative of additional amounts of weight which each passenger may have compared with the likelihood of weight expressed in said single passenger fuzzy set, including basis elements of possible additional passenger weight and corresponding membership values indicative of the likelihood of a passenger having the related additional weight, with a carried weight fuzzy set including basis elements indicative of various amounts of weight which each passenger may be carrying and corresponding membership values indicative of the likelihood of a passenger carrying the related weight.

3. A method according to claim 2 wherein the basis elements of said carried weight fuzzy set are indicative of the weight of various amounts of clothing.

4. A method according to claim 3 wherein said carried weight fuzzy set is different for different seasons.

5. A method according to claim 2 wherein the basis elements of said carried weight fuzzy set are indicative of the weight of packages being carried by passengers.

6. A method according to claim 5 wherein said carried weight fuzzy set is different for different times of day.

7. A method according to claim 5 wherein said carried weight fuzzy set is different for the up direction than for the down direction.

8. A method according to claim 7 wherein said carried weight fuzzy set is different for different times of day.

9. A method of dispatching a plurality of elevator cars in a building comprising:
  providing a plurality of signals representing a basic fuzzy set for a single passenger including basis elements of the possible amounts of weight which one passenger may add to an elevator car and corresponding membership values indicative of the likelihood that one passenger has added the related amount of weight to the car ;
  providing a plurality of signals representing a factor fuzzy set for a single passenger including basis elements indicative of various amounts of weight which each passenger may be carrying and corresponding membership values indicative of the likelihood of a passenger carrying the related weight;
  providing a plurality of signals representing a plurality of composite fuzzy sets, one for each possible number, N, of passengers which may be in the elevator, each reflecting N times the fuzzy summation of said basic fuzzy set and said factor fuzzy set;
  providing a weight signal indicative of the weight of passengers in an elevator;
  providing a plurality of signals representing a passenger count fuzzy set in which each of the terms corresponds to a related term of one of said composite fuzzy sets which has a basis element equaling the weight indicated by said weight signal, each term of said passenger count fuzzy set having a basis element equaling the number of passengers corresponding to the composite fuzzy set of the related term and a degree of membership the same as the degree of membership of said related term; and
  dispatching elevators to provide service in said building in response to a process using the signals of said passenger fuzzy set to provide corresponding representations of the number of passengers in said elevator.

10. A method according to claim 9 wherein the basis elements of said carried weight fuzzy set are indicative of the weight of various amounts of clothing.

11. A method according to claim 10 wherein said carried weight fuzzy set is different for different seasons.

12. A method according to claim 9 wherein the basis elements of said carried weight fuzzy set are indicative of the weight of packages being carried by passengers.

13. A method according to claim 12 wherein said carried weight fuzzy set is different for different times of day.

14. A method according to claim 12 wherein said carried weight fuzzy set is different for the up direction than for the down direction.

15. A method according to claim 14 wherein said carried weight fuzzy set is different for different times of day.

16. A method according to claim 9 wherein said step of providing signals representing a factor fuzzy set comprises:
  providing signals representing said factor fuzzy set as the fuzzy summation of a fuzzy set including basis elements indicative of various amounts of weight which each passenger may be carrying and corresponding membership values indicative of the likelihood of a passenger carrying the related weight, with a fuzzy set including basis elements indicative of additional amounts of weight which each passenger may have compared with the likelihood of weight expressed in said single passenger fuzzy set, including basis elements of possible additional passenger weight and corresponding membership values indicative of the likelihood of a passenger having the related additional weight.

17. A method according to claim 1 wherein said additional amounts of weight include country-related weight variations of passengers.

18. A method according to claim 1 wherein said additional amounts of weight include time and direction related variations in the weight of packages being carried by passengers.

19. A method according to claim 1 wherein said additional amounts of weight include seasonally related weight variations in clothing worn by passengers.

20. A method according to claim 2 wherein said additional amounts of weight include country-related weight variations of passengers.

* * * * *